235-382 SR
12/8/87 XR 4,712,103

United States Patent [19]
Gotanda

[11] Patent Number: 4,712,103
[45] Date of Patent: Dec. 8, 1987

[54] DOOR LOCK CONTROL SYSTEM

[76] Inventor: Motohiro Gotanda, 1802-10, Nakabyo, Abiko-shi, Chiba-ken, Japan

[21] Appl. No.: 804,083

[22] Filed: Dec. 3, 1985

[51] Int. Cl.[4] .......................... G06F 7/04; G07D 7/00; G06K 9/00

[52] U.S. Cl. .......................... 340/825.31; 340/825.34; 235/382; 382/2

[58] Field of Search ........... 340/825.3, 825.31, 825.32, 340/825.33, 825.34; 361/171, 172; 70/263, 278; 382/2; 358/108; 235/380, 382

[56] References Cited

U.S. PATENT DOCUMENTS 3,805,238 4/1974 Rothfjell .................................. 382/2
4,006,459 2/1977 Baker et al. ..................... 340/825.31
4,581,634 4/1986 Williams .............................. 358/108

FOREIGN PATENT DOCUMENTS 2077014 12/1981 United Kingdom ................ 358/108

*Primary Examiner*—Ulysses Weldon
*Assistant Examiner*—Ralph E. Smith
*Attorney, Agent, or Firm*—Stephen F. K. Yee

[57] ABSTRACT

A door lock control system including keys each having a memory storing information of the key number and the key owner's face as video data. When the key is inserted into the door lock, the face image is reproduced on a CRT according to the face information stored in the key. A TV camera also takes the face image of the key handling person for displaying same on another CRT so that one can judge, by comparison of the face images on CRT, whether the person is the same as the key owner. The system further includes a central storage unit in which a portion of the video data in each key is stored as a collation word. Upon insertion of the key into the door lock, the collation word is read out according to the information of the key number stored in the key. The read out word is compared with the portion of the video data stored in the key to check whether the key is one of those owned by the predetermined key owners.

3 Claims, 5 Drawing Figures

DOOR LOCK CONTROL SYSTEM

BACKGROUND OF THE INVENTION

This invention relates to a door lock control system which allows the unlocking of the door only when the lock is operated by predetermined persons with respective predetermined keys.

For identification of the person who wishes to enter a gate or a door, it has been the conventional practice in the art to resort to one of the following methods (1) to (4):

(1) Recognition by the ratio of the lengths of five fingers of the person;

(2) Recognition by finger print of the person;

(3) Recognition by voice of the person; and (4) Recognition by other means.

In this connection, the method (1) lacks considerations for disabled persons and involves a sanitary problem because the users have to put their five fingers on a specified contact surface.

The method (2) is difficult to propagate in view of various problems backgrounded by moral repulsion.

With regard to the method (3), the person will more or less feel perplexed to talk to a door no matter whether or not someone is in. In addition, this method is easily deceived by reproduction of recorded voice.

As for an example of the method (4), it is known to register a secret pass number on a magnetic tape of an ID (identification) card. The pass number on the ID card is read out by an input device when the card is inserted thereinto, and is collated with a keyed-in pass number. This method, however, is not reliable enough because of the easiness of duplication of the card.

Further, there is a method of using ID cards each having a photo of the card owner's face, which is to be shown to a guardman at the time of entering a gate or door. However, this method lacks reliability and efficiency because of the difficulty of identifying a card bearer by a photograph promptly within a limited time and because of easiness of preparing forged ID cards.

Under these circumstances, there is an increasing demand for a security system for checking the entrance to building, rooms or other important facilities to prevent ingression of illegal intruders including terrorists.

SUMMARY OF THE INVENTION

The present invention aims at the elimination of the above-mentioned problems, and has as its object the provision of a supervisory door lock control system which can detect the use of forged keys and which can be used without arousing a resistive feeling on the part of the key users.

In accordance with the present invention there is provided a door lock control system which comprises:

keys owned by respective predetermined key owners, assigned with respective predetermined key numbers, each adapted for insertion into the key hole and each having a memory storing information of the key owner's face as video data and information of the key number;

information storage means storing information of a predetermined portion of the video data stored in the memory of each of the keys;

processing means adapted for being electrically coupled to the memory of the key inserted into the keyhole and for reading out (A) the information of the key owner's face stored in the memory of the key inserted into the keyhole, (B) the information of the key number stored in the memory of the key inserted into the keyhole, (C) selected one of the information of the predetermined portions of the video data stored in the information storage means according to the information (B) of the key number read out by the processing means and (D) information of the predetermined portion of the video data stored in the memory of the key inserted into the keyhole;

verifying means coupled to the processing means for judging whether or not the information (C) read out by the processing means corresponds to the information (D) read out by the processing means;

first display means coupled to the processing means for displaying the key owner's face according to the information (A) read out by the processing means;

a television camera disposed outside of the door for taking the face image of the person who has inserted the key into the keyhole; and second display means coupled to the television camera for displaying the face image of the person taken by the television camera.

According to the present invention, the face information of a genuine key owner, which is stored as video data in a memory of the key, is read out upon inserting the key in the lock and displayed on a first TV screen. At the same time, the face of the key handling person is taken by a TV camera and displayed on a second TV screen disposed side by side with the first TV screen. Thus, by comparing the face images on the first and second screens, one can judge whether or not the key handling person is the same as the owner of that key. On the other hand, a predetermined portion of the video data stored in the key is stored, as a collating word for example, in a central storage device. When the key is inserted in the lock, the collating word is read out and is fed to a verifying means. At the same time, the verifying means receives the predetermined portion of the video data stored in the key and compares same with the collating word. The predetermined portion of the video data is preferably signals of a predetermined scan line of the video data. By such comparison, one can determine whether or not the key inserted in the lock is a genuine key.

BRIEF DESCRIPTION OF THE INVENTION

The above and other objects, features and advantages of the invention will become apparent from the following description and the appended claims, taken in conjunction with the accompanying drawings, in which:

DETAILED DESCRIPTION OF THE PREFFERED EMBODIMENTS OF THE INVENTION

Figure 1:
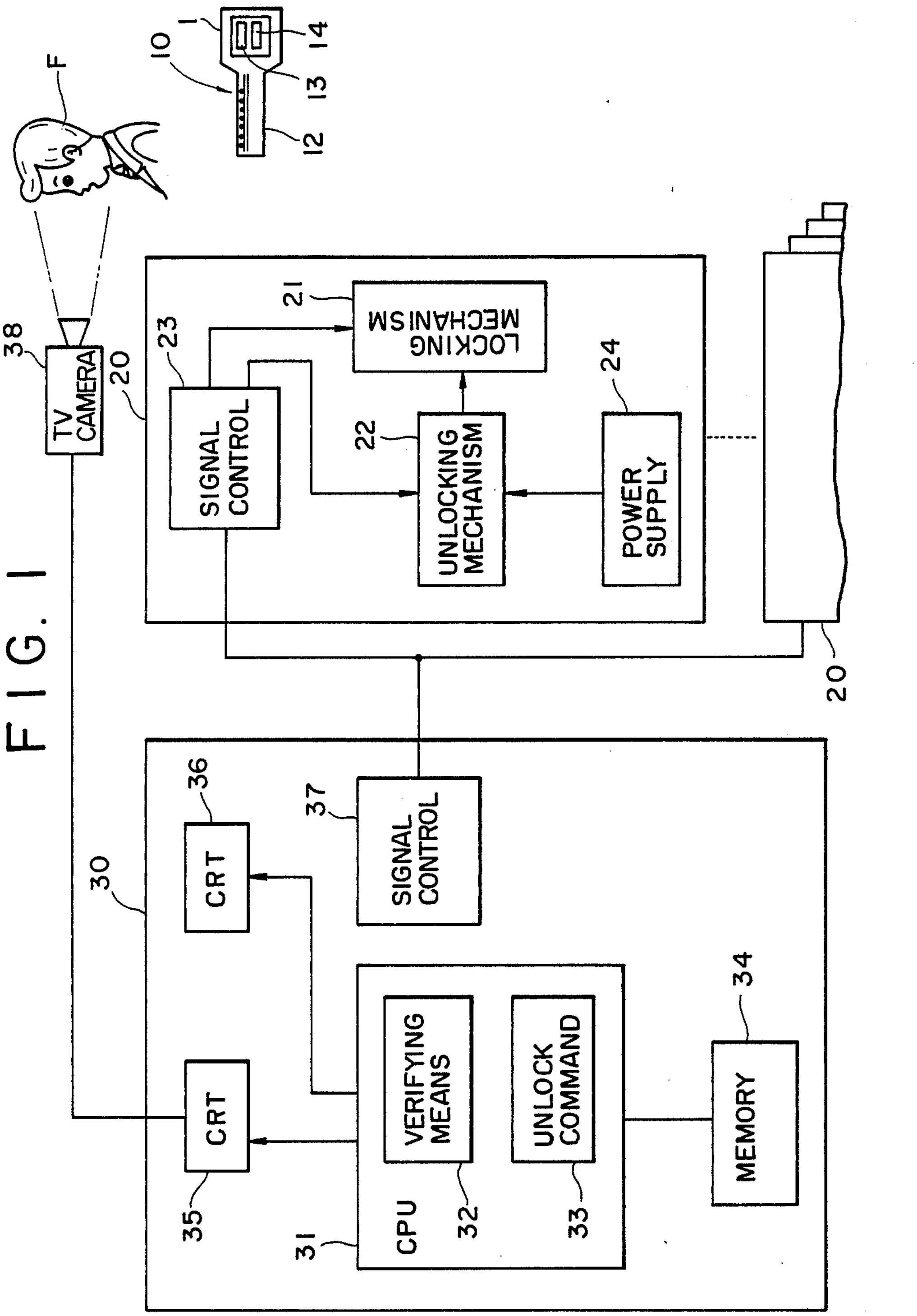
FIG. 1 is a block diagram showing the general layout of an embodiment of the door lock control system according to the present invention.

FIG. 1 illustrates general arrangement of a door lock control system according to the present invention, in which designated as 10 is a key assigned with a predetermined key number and owned by a predetermined owner. The reference numerals 20 and 30 designate a lock device and a supervisory section installed in a supervisory control room, respectively. The lock 20 and supervisory section 30 are shown separately for the convenience of explanation although they can be dealt with as one relative to the key 10.

The key 10 is formed of, for example, an insulating material like ceramics, and has a grip portion 11 and a key portion 12. In this case, at least the key portion 12 needs to be of an insulating material. Provided in the grip portion 11 are memories 13 and 14 which store the key number and face information of the key owner in a digitized form. Similar keys with different key number information and different face information are owned by different predetermined persons.

The lock 20 includes a locking mechanism 21, an unlocking mechanism 22, a signal transfer control means 23 and a power supply 24. A plural number of similar locks 20 may be connected to the supervisory section 30. The supervisory section 30 includes a CPU (central processing unit) 31, a verifying means 32, an unlock command means 33, a memory 34, CRT (cathod ray tubes) 35 and 36, a signal transfer control circuit 37, and a TV (television) camera 38.

The memory 34 stores a predetermined portion of the video data stored in the memory 14 of each of the keys 10. The predetermined portion of the video data is preferably video signals of a predetermined scan line of the face information (video data) stored in the memory 14, the video signals being encoded into a collation word. Thus, the memory 34 stores collation words of respective keys with the corresponding key numbers serving as their addresses.

The above-described lock control system operates in the manner as follows.

Upon inserting the key 10 in the keyhole of the lock device 20, the information stored in the memories 13 and 14 of the key 10, namely the key number information and the face information, are read out and sent to the CPU 31 of the supervisory section 30 through the signal transfer control circuit 23 and stored in a buffer memory (not shown). The CRT 36 then reproduces the face of the owner of the key inserted into the keyhole. On the other hand, the face F of the person who has inserted the key into the keyhole (key handler) is taken by the TV camera 38 and its image is displayed on the CRT 35. Since the CRT 35 and 36 are installed in the supervisory room side by side, a supervisor can compare the two images easily by eye observation to judge whether or not the key handler is the genuine key owner.

In the meantime, the collation word corresponding to the key number of the key 10 inserted into the keyhole is read out from the memory 34 and checked by the verifying means 32 to see whether or not it conforms with the signals of the predetermined scan line of the video data read out from the memory 14 of the key 10. If the collation word read out from the memory 34 is judged as corresponding to the scan line read out from the memory 14, the key inserted into the keyhole is regarded as being one of those owned by the predetermined key owners.

Figure 2:
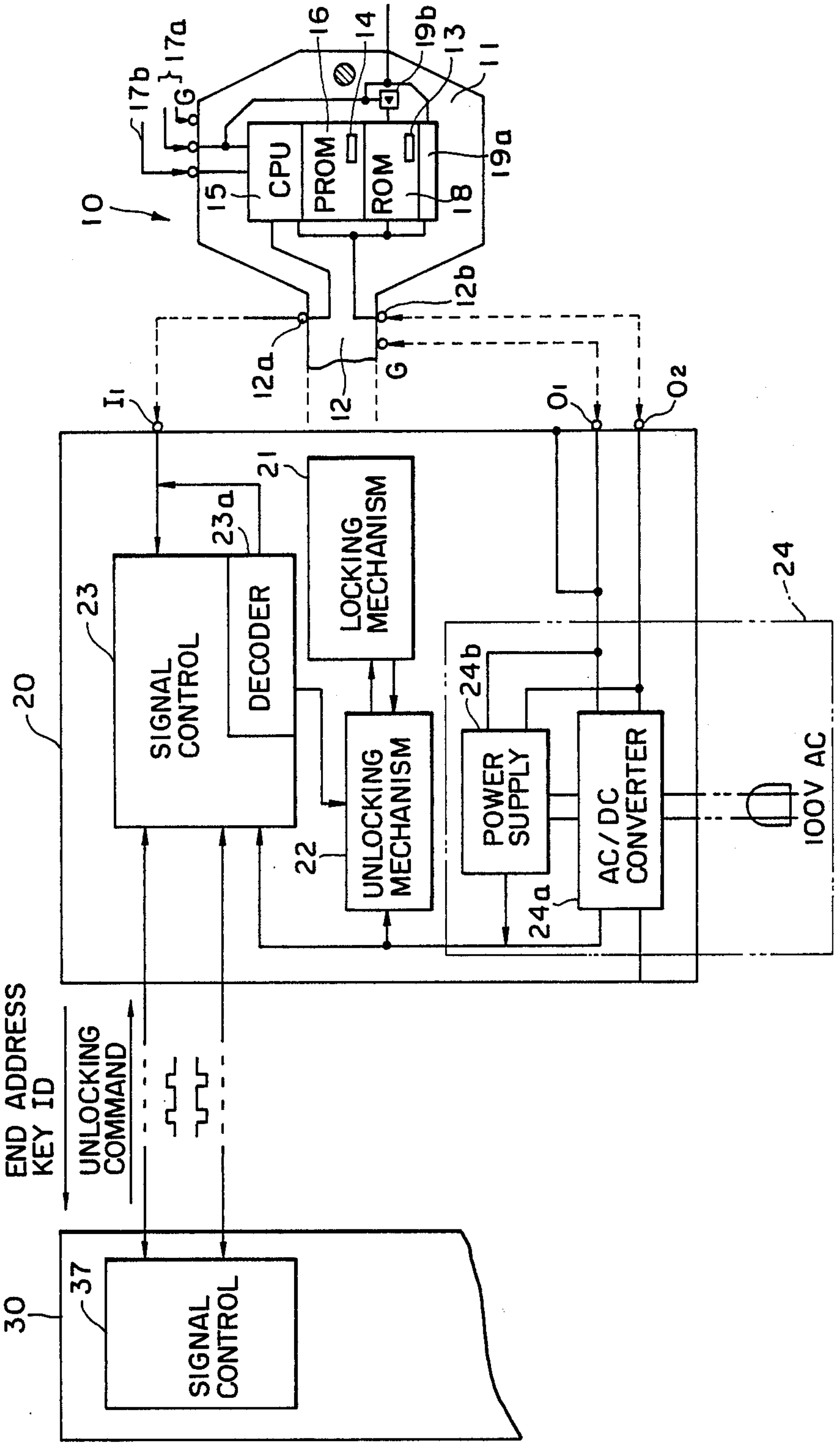
FIG. 2 is a block diagram showing details of the embodiment of FIG. 1.

The block diagram of FIG. 2 illustrates in detail the essential part of the door lock control system of FIG. 1. The exchange of information between the signal transfer control means 37 of the supervisory section 30 and the lock device 20 is effected by, for example, interrupt base or multidrop. The key 10 is preferably formed of a non-magnetic ceramic material and is provided at its grip portion 11 with a chip which includes CPU 15, PROM 16, power terminals 17*a*, an input port 17*b*, ROM 18, a clock generator 19*a*, and a DC voltage converter 19*b* (depending upon the characteristics of the ROM 18). Further provided in the key groove portion 12 are an information output terminal 12*a* for sending out the face information from PROM 16 and the key master information from ROM 18, and a DC power terminal 12*b* for receiving DC power supply. The grip portion 11 is protected against vibrations and static electricity. The lock 20 is built in an arbitrary door and provided with output ports $O_1$ and $O_2$ for supplying DC power to the power terminals 12*b* of the inserted key 10 and with an input port $I_1$ for receiving information from the terminal 12*a* of the key 10. The signal transfer control circuit 23 which exchanges information with an I/O control circuit (which will be described hereinafter) includes a decoder 23*a* from which an unlocking signal is fed to the unlocking mechanism 22 in response to a command from an I/O control means 37. The locking mechanism 21 drives a latch bolt which is not shown. Denoted at 24*a* is an AC/DC converter provided with a back-up power supply 24*b* for use on the occasion of service interruption or similar troubles.

Figure 3:
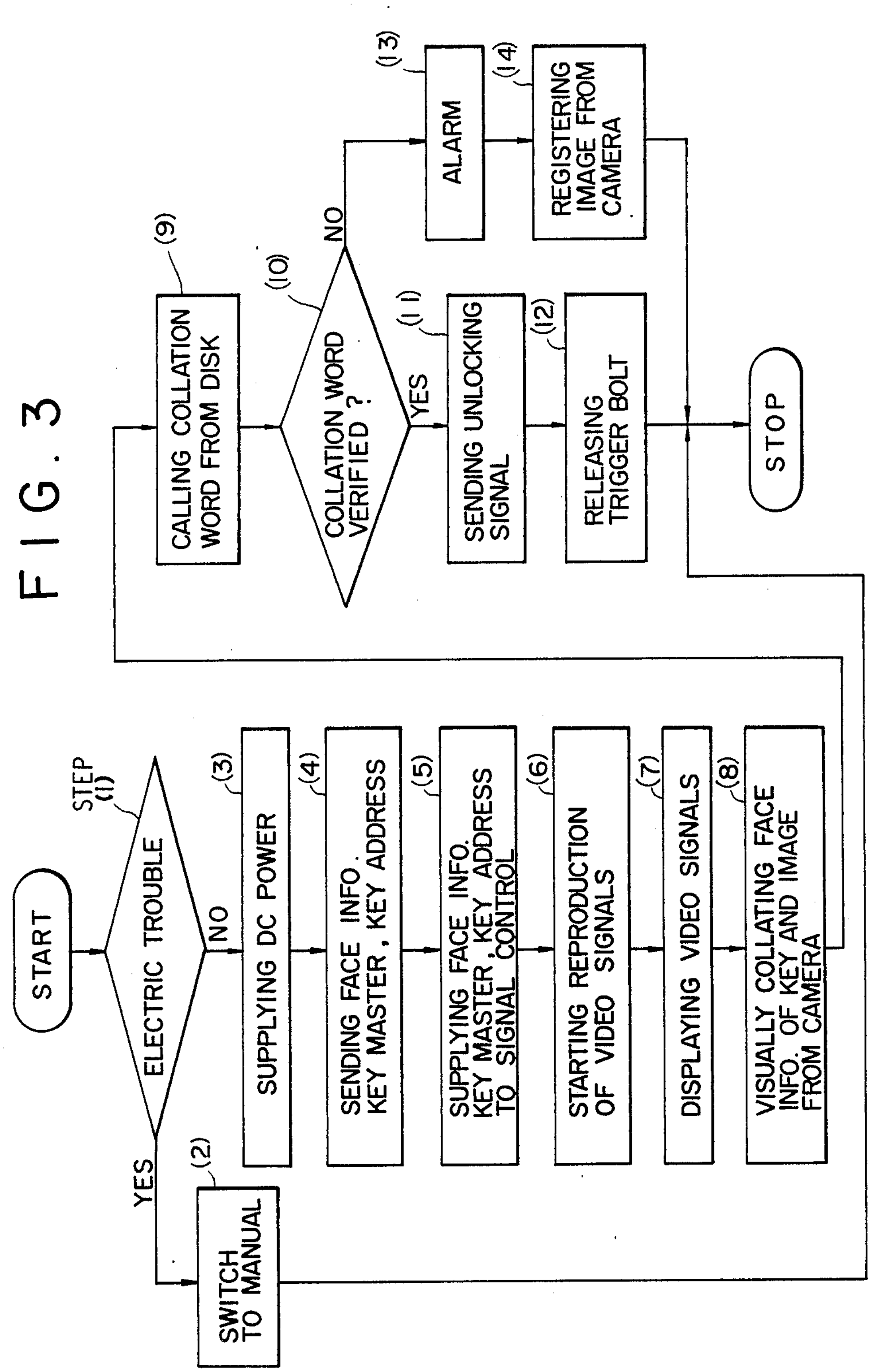
FIG. 3 is a flow chart for explaining operations of the system of FIG. 2.

The operation of the system shown in FIG. 2 will now be described below with reference to the flow chart of FIG. 3.

Upon inserting a key 10 in the keyhole of the lock 20, the operation is started. In Step (1), whether there is an electrical trouble such as service interruption is checked. If a trouble is found, the unlocking operation is switched to a manual mode (Step (2)) wherein the lock can be released manually by the key 10 serving as an electronic key.

In a sound state free of electrical troubles, DC power is supplied to the DC power terminal 12*b* from the output port $O_1$ and $O_2$ (Step (3)). Thus, in step (4), the face information in PROM 16 and the key number information (actually a key master of a coded number ) and the key address specifying a predetermined scan line of video signals in ROM 18 are sent to the signal transfer control means 37 of the supervisory section 30 through the signal transfer control circuit 23. Upon receipt of the information stored in the key 10 (Step (5)), CPU 31 starts to reproduce the face image according to the video signals in PROM 16 (Step (6)) and displays the face image on CRT 36 (Step (7)). The displayed image is compared with the image on CRT 35 taken by the TV camera 38 to to determine if the key handler is the genuine key owner by eye observation (Step (8)) by a supervisor. If the key handler is judged as being the genuine key owner, the operation is proceeded to the next step, i.e. Step (9). This can be done by, for example, pushing a key (not shown) by the supervisor.

In step (9), CPU calls out the collation word selected from the memory 34 according to the key number information received from the key 10. The verifying means 32 receives the selected collating word and compares it with the video signals of the predetermined scan line of the face information stored in the PROM 16 (Step (10)).

If the verifying means judges that the selected collation word corresponds to the information of the predetermined scan line of the video data stored in the key, namely, if the key is proved to be the genuine key, the verifying means 32 outputs an instruction signal which is received by the lock release command means 33. Upon receipt of the instruction signal, the command means 33 sends a door unlocking command to the unlocking mechanism 22 (Step (11)) so that a trigger bolt (not shown) of the lock is released to allow the door to be opened (Step (12)). On the contrary, if the key is judged not to be the genuine key in Step (10), an alarm is actuated (Step (13)), while registering on a list the image from the TV camera 38 as a figure who needs attention (Step (14)). Similar alarm and registering operation may be made, if desired, in the visual judging step (Step (8)).

Figure 4:
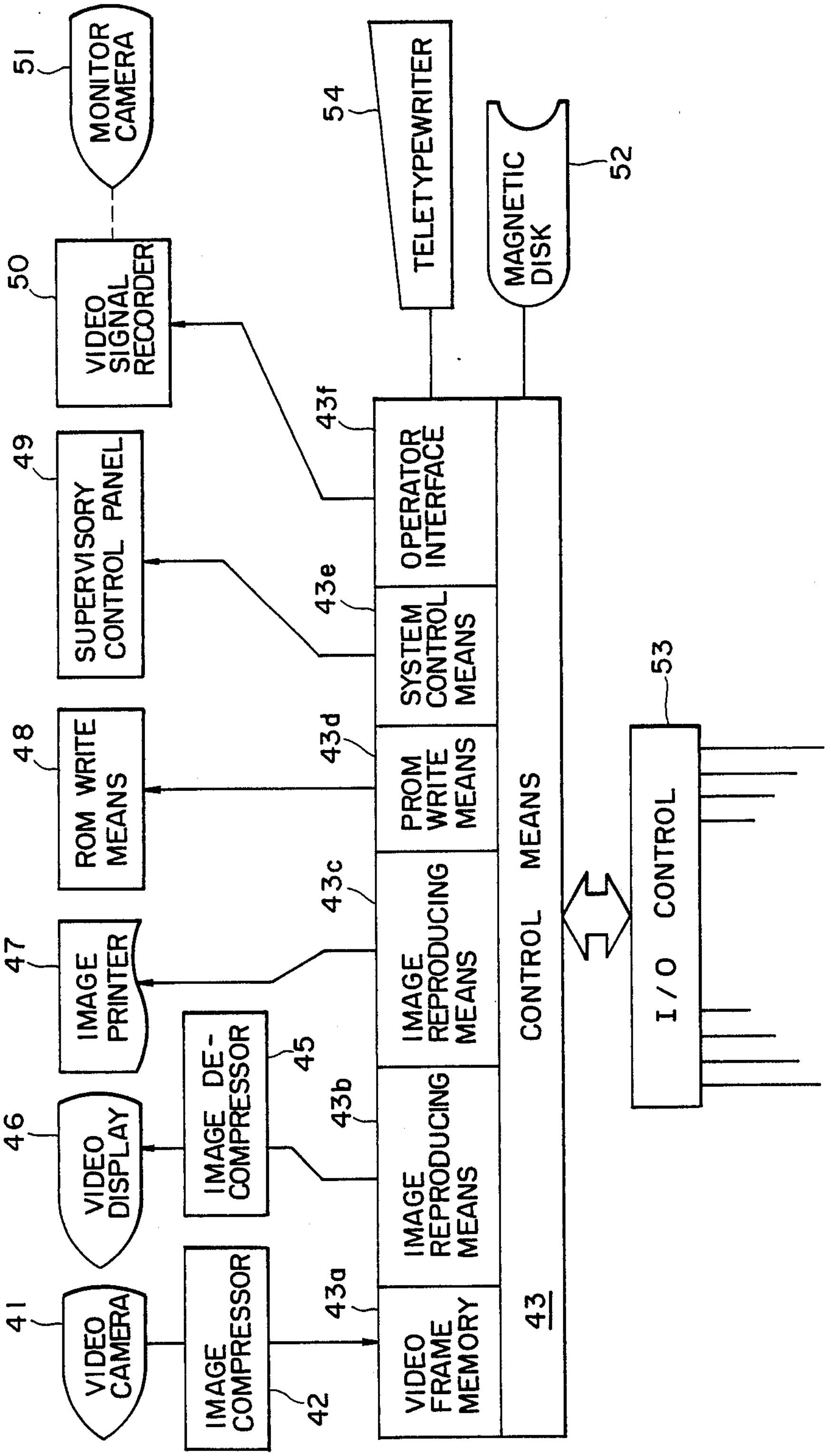
FIG. 4 is a block diagram showing a system for writing information into a key and for registering a collating word.

Shown in FIG. 4 is a system arrangement for explaining the operation of writing the necessary information in the memories of the keys and of registering the collation words. Indicated at 41 is a video camera for taking the image of each key owner's face, for example, within an area of 51.2 cm (width)×48 cm (height). The camera 41 is provided with a focussing mechanism in order to obtain the information in every part of the key owners' faces. Designated at 42 is an image compressor by which the picture image from the video camera 41 is bit-compressed to $\frac{1}{4}$, for example, and the compressed video signals are stored in a video frame memory 43*a* of the control means 43. In addition to these video signals, the video frame memory 43*a* stores a key master and key address for each key which are introduced by a teletypewriter 54.

The control means 43 further includes image reproducing means 43*b* and 43*c*, PROM writing means 43*d*, system control means 43*e*, and an operator interface 43*f*. The image reproducing means 43*b* reads out the compressed information of the key owner's face from the key and sends it to the image decompressor 45, by which the read-out face information is expanded to reproduce the image on the video display 46. Similarly, the image reproducing means 43*c* reads out the compressed information of the key owner's face from the key and sends it to the image printer 47.

The PROM writing means 43*d* writes the key owner's video signals, key master and key address, which are stored in the video frame memory 43*a*, using the ROM writing means 48. The system control means 43*e* controls the supervisory control panel 49 and video signal recorder 50. This video signal recorder 50 receives the picture image from the monitor camera 51. The operator interface 43*f* connects the data from the teletypewriter 54 to the control means 43 in coded form.

Indicated at 52 is a magnetic disc which can store a great deal of video signals. Thus, the disc 52 stores in respective frames video information and key masters which are the same as those in the video frame memory 43*a*, along with the collating words which are binary signals of predetermined scan lines of the video data designated by the key addresses.

When the key 10 is inserted into the electric lock, the control means 43 reads out the collation word stored in the magnetic disc 52, i.e. binary signals formed by extracting a scan line of a specified address, according to the key master stored in the memory of the key. This collation word is compared with the video signals of the scan line of the video data stored in the memory of the key, sending out an unlocking command when they correspond to each other. Indicated at 53 is an I/O control which serves as an interface between the lock device 20 and the signal transfer control means 37.

Figure 5:
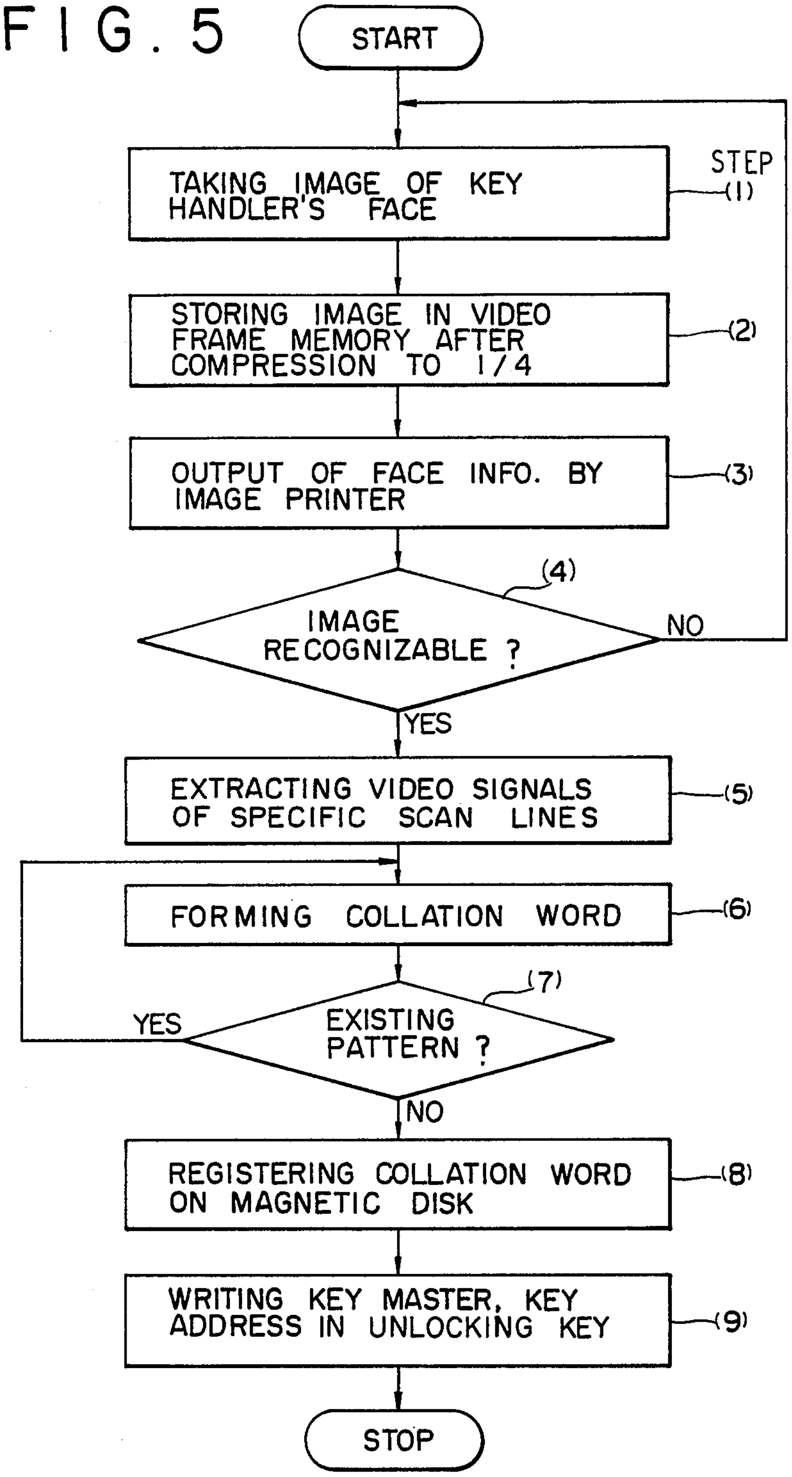
FIG. 5 is a flow chart for explaining operations of the system of FIG. 4.

Reference is now had to the flow chart of FIG. 5 for explanation of the information writing operation including Steps (1) to (11).

In order to write the face information into the PROM 16 of the key 10 along with the key address and key master, the image of the owner's face which is taken by the video camera 41 of the supervisory control center (Step (1)) is compressed, for example, to $\frac{1}{4}$ by the image compressor 42 and stored in the video frame memory 43*a* (Step (2)).

The stored face information is reproduced by the image printer 47 through the image reproducing means 43*c* (Step (3)) to see if the reproduced image is recognizable (Step (4)). If not recognizable, Step (1) to Step (4) are repeated again. If recognizable, the video signals of a desired scan line are extracted from the video signal which are stored in the video frame memory 43*a*, from which a collation word, for example, a binary signal (black and white signals) of 64 bits is prepared by comparing the signals with a certain threshold value (Step (6)). The thus formed collation word is compared with the existing collation words previously stored in the magnetic disk 52 by the control means 43 to check for existence of an identical pattern (Step (7)).

If it is turned out to be identical to an existing pattern, a command is sent to change the specified scan line to another desired one, and the operation returns to Step (6) to form the binary signal again. On the other hand, if no identical pattern is found in Step (7), the binary signal is registered on the magnetic disk 52 (Step (8)). At the same time, PROM write means 43*d* writes the face information in PROM 16 of the key 10 while writing the key master and key address in ROM 18 through the ROM write means 48.

It will be appreciated from the foregoing that, according to the present invention, there is provided a door lock control system which includes keys each having a memory storing information of its key owner's face as video data and information of its key number, information storage means storing collation words each formed by coding video signals of a predetermined scan line of the face information of respective key owner, a TV camera, and a verifying means for collating the signals of the predetermined scan line of the face information stored in the key inserted in the lock with the collation word for verification. Accordingly, it becomes impossible to copy the keys. Further, the supervisory lock control system can be operated without arousing repulsive or unpleasant feeling on the part of the user.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A door lock control system comprising:

door lock means having a keyhole;

plurality of keys owned by respective predetermined key owners, assigned with respective predetermined key numbers, each adapted for insertion into the keyhole and each having a memory storing information of the owner's face as video data and information of the key number;

information storage means storing information of a predetermined portion of the video data stored in the memory of each of said keys and correlated to each key number;

processing means adapted for being electrically coupled to the memory of said key inserted into the keyhole and for reading out (A) the information of the key owner's face stored in the memory of said key inserted into the keyhole, (B) the information of the key number stored in the memory of said key inserted into the keyhole, (C) selected one of the information of the predetermined portions of the video data stored in the information storage means according to the information (B) of the key number, and (D) information of the predetermined portion of the video data stored in the memory of said key inserted into the keyhole;

the predetermined portion of the video data being video signals of a predetermined scan line of the video data;

verifying means coupled to the processing means to verify whether or not the information (C) read out from the information storage means by the processing means corresponds to the information (D) read out from the memory of the key by the processing means;

first display means coupled to the processing means for displaying said key owner's face according to the information (A) read out by the processing means;

a television camera disposed outside of the door for taking the face image of the person who has inserted said key into the keyhole; and second display means coupled to said television camera for displaying the face image of said person taken by said television camera, to permit comparison of the displayed face images of said first and second display means, and determination whether or not said person inserting the key is the same as the predetermined owner of said key and, from the verifying means a determination whether or not the key inserted into the keyhole is one of those owned by the predetermined key owners.

2. The door lock control system as claimed in claim 1, wherein the information storage means stores said video signals as a collating word.

3. The door lock control system as claimed in claim 1, further comprising recording means for recording the face image of said person taken by the television camera, said recording means being operated when the information (C) does not correspond to the information (D).

* * * * *